US012624222B2

(12) United States Patent (10) Patent No.: US 12,624,222 B2
Zhang et al. (45) Date of Patent: May 12, 2026

(54) SPECIAL POWDER COATING FOR SUPER WEATHER-RESISTANT COMPOSITE, AND PREPARATION METHOD THEREOF, AND COATING METHOD

(71) Applicants: NEWMAT (Beijing) Environmental Materials Tech Co., Beijing (CN); Cangzhou NEWMAT Advanced Materials Technology Co., Cangzhou (CN)

(72) Inventors: Jiansen Zhang, Beijing (CN); Zhengyao Liu, Beijing (CN); Hao Chen, Beijing (CN); Aibin Xu, Beijing (CN)

(73) Assignees: NEWMAT (Beijing) Environmental Materials Tech Co., Beijing (CN); Cangzhou NEWMAT Advanced Materials Technology Co., Cangzhou (CN)

( * ) Notice: Subject to any disclaimer, the term of this patent is extended or adjusted under 35 U.S.C. 154(b) by 0 days.

(21) Appl. No.: 18/975,239

(22) Filed: Dec. 10, 2024

(65) Prior Publication Data

US 2026/0002029 A1     Jan. 1, 2026

(30) Foreign Application Priority Data

Jun. 28, 2024     (CN) .......................... 202410851190.1

(51) Int. Cl.
B05D 1/12          (2006.01)
B05D 3/02          (2006.01)
         (Continued)
(52) U.S. Cl.
CPC .............. C09D 5/031 (2013.01); B05D 1/12 (2013.01); B05D 3/0218 (2013.01); C09D 5/035 (2013.01);
         (Continued)

(58) Field of Classification Search
CPC ........ C09D 5/031; C09D 7/62; C09D 133/08; C09D 167/02
See application file for complete search history.

(56) References Cited

U.S. PATENT DOCUMENTS

2016/0121361 A1     5/2016 Lendl et al.
2019/0276678 A1*    9/2019 Millero ............... C09D 123/04
                    (Continued)

FOREIGN PATENT DOCUMENTS

CN          104530408 A      4/2015
CN          104877497 A      9/2015
                    (Continued)

OTHER PUBLICATIONS

Machine translation of Zhang et al (CN104877497), publication date Sep. 2, 2015.*

(Continued)

*Primary Examiner* — Jun Li
(74) *Attorney, Agent, or Firm* — Jacob M. Ward; Ward Law Office LLC

(57)          ABSTRACT

A special powder coating for a super weather-resistant composite, and a preparation method and use thereof, and a coating method are provided. The special powder coating for the super weather-resistant composite includes components of, in percentages by mass: 0% to 50% of a modified acrylate, 20% to 75% of a polyester resin, 15% to 20% of an isophorone diisocyanate (IPDI) adduct, 0.1% to 0.8% of a texturing agent, 4.3% to 22.7% of a transparent filler powder, 0.8% to 1.2% of a pigment, 0.1% to 0.2% of a toughening agent, 0.1% to 0.3% of nano-alumina, and 0% to 2% of a conductive agent, the components having a sum of mass percentages of 100%.

12 Claims, 7 Drawing Sheets

(51) Int. Cl.
    *C09D 5/03*      (2006.01)
    *C09D 7/62*      (2018.01)
    *C09D 133/08*    (2006.01)
    *C09D 167/02*    (2006.01)

(52) U.S. Cl.
    CPC ............. *C09D 7/62* (2018.01); *C09D 133/08*
    (2013.01); *C09D 167/02* (2013.01); *B05D*
    *2350/60* (2013.01)

(56) References Cited

U.S. PATENT DOCUMENTS

| | | | |
|---|---|---|---|
| 2019/0382613 A1* | 12/2019 | Ito ......................... | C09D 175/04 |
| 2021/0253895 A1* | 8/2021 | Liao ...................... | C09D 167/06 |
| 2023/0295459 A1* | 9/2023 | Miyanaga ............ | C09D 175/06 |
| | | | 428/425.5 |
| 2024/0018385 A1* | 1/2024 | Watanabe ................ | C09D 7/48 |
| 2024/0279503 A1* | 8/2024 | Larimer ............. | C08G 59/3209 |
| 2024/0294698 A1* | 9/2024 | Brinkhuis ............ | C08G 18/341 |

FOREIGN PATENT DOCUMENTS

| | | | | |
|---|---|---|---|---|
| CN | 110128920 A | | 8/2019 | |
| CN | 116814027 A | | 9/2023 | |
| CN | 118406430 A | | 7/2024 | |
| CN | 118681770 A | * | 9/2024 | ............... B05D 1/06 |
| EP | 4455179 A1 | * | 10/2024 | ......... C08G 18/4277 |
| JP | 2024090423 A | * | 7/2024 | |
| WO | WO-2022256783 A1 | * | 12/2022 | ............ C08F 220/14 |

OTHER PUBLICATIONS

Machine translation of Chang (CN110128920), publication date Aug. 16, 2019.*

Machine translation of Xu et al (CN118681770), pulication date Sep. 24, 2024.*

International Search Report for PCT/CN2024/117197 dated Dec. 23, 2024.

\* cited by examiner

SPECIAL POWDER COATING FOR SUPER WEATHER-RESISTANT COMPOSITE, AND PREPARATION METHOD THEREOF, AND COATING METHOD

CROSS REFERENCE TO RELATED APPLICATION

This patent application claims the benefit and priority of Chinese Patent Application No. 202410851190.1 filed with the China National Intellectual Property Administration on Jun. 28, 2024, and entitled with "SPECIAL POWDER COATING FOR SUPER WEATHER-RESISTANT COMPOSITE, AND PREPARATION METHOD THEREOF, AND COATING METHOD", the disclosure of which is incorporated by reference herein in its entirety as part of the present application.

TECHNICAL FIELD

The present disclosure relates to the technical field of powder coatings, and in particular relates to a special powder coating for a super weather-resistant composite, and a preparation method and use thereof, and a coating method.

BACKGROUND

A composite is a novel material that is composed of two or more materials by physical or chemical methods. The composite has excellent properties that cannot be matched by a single material, such as high strength, high stiffness, low density, and desirable dimensional stability and corrosion resistance, and therefore has been widely used in fields such as aerospace, automobile, electronics, and construction. However, the surface treatment of composites has always been a difficult problem, because the surface state of composites is very different from that of metal materials, such as low surface energy, a large amount of release agent residue on the surface, and uneven surface stress, resulting in a great impact on the effect of the surface treatment. A powder coating is suitable for metal surfaces and is a novel coating. The powder coating is a solid powder material composed of solid resin and pigment, filler, and additives, and is electrostatically sprayed, frictionally sprayed (thermosetting method), or dip-coated on a fluidized bed (thermoplastic method), and then heated, melted, and solidified to form a smooth, bright, and permanent coating film. The powder coating has advantages such as no solvent pollution, 100% film formation, low energy consumption, simple construction, high efficiency, safety without toxicity, and convenient storage and transportation.

The prior art discloses that a powder coating is applied to a surface of the composite, for example by dip-coating on a fluidized bed (thermoplastic method) or spraying to apply the powder coating to a mold or a coated object. A resulting system is heated and pressurized, such that the powder is impregnated into the composite to form a protective film by hot press molding. Although the prior art has solved the problem of applying powder coatings to composite surfaces to some extent, there are still some problems and shortcomings. For example, the surface state of composites is very different from that of metallic materials, which results in poor adhesion of existing powder coatings on the surface of composites, causing them to peeling or falling off easily.

SUMMARY

In view of this, an object of the present disclosure is to provide a special powder coating for a super weather-resistant composite, and a preparation method and use thereof, and a coating method. The special powder coating provided by the present disclosure is suitable for a composite, has strong adhesion to the composite, and can form a smooth and defect-free coating on a surface of the composite.

To achieve the above object, the present disclosure provides the following technical solutions:

The present disclosure provides a special powder coating for a super weather-resistant composite, including components of, in percentages by mass:

0% to 50% of a modified acrylate, 20% to 75% of a polyester resin, 15% to 20% of an isophorone diisocyanate (IPDI) adduct, 0.1% to 0.8% of a texturing agent, 4.3% to 22.7% of a transparent filler powder, 0.8% to 1.2% of a pigment, 0.1% to 0.2% of a toughening agent, 0.1% to 0.3% of nano-alumina, and 0% to 2% of a conductive agent, the components having a sum of mass percentages of 100%.

In some embodiments, the special powder coating for the super weather-resistant composite includes the components of, in percentages by mass:

40% to 48% of the modified acrylate, 20% to 24% of the polyester resin, 15% to 18% of the IPDI adduct, 0.3% to 0.5% of the texturing agent, 7.1% to 8.2% of the transparent filler powder, 1% to 1.2% of the pigment, 0.15% to 0.2% of the toughening agent, 0.1% to 0.15% of the nano-alumina, and 0.3% to 0.6% of the conductive agent.

In some embodiments, the special powder coating for the super weather-resistant composite includes the components of, in percentages by mass:

68% to 76% of the polyester resin, 15% to 18% of the IPDI adduct, 0.3% to 0.5% of the texturing agent, 7.1% to 8.2% of the transparent filler powder, 1% to 1.2% of the pigment, 0.15% to 0.2% of the toughening agent, 0.1% to 0.15% of the nano-alumina, and 0.3% to 0.6% of the conductive agent.

In some embodiments, the special powder coating for the super weather-resistant composite further includes a double-layer coated aluminum powder, wherein the double-layer coated aluminum powder in the special powder coating for the super weather-resistant composite has a mass percentage of 0.5% to 5%.

In some embodiments, the double-layer coated aluminum powder has a particle size of 0.5 nm to 3 nm, and the double-layer coated aluminum powder is a layered double capsule, the layered double capsule being a non-floating aluminum powder double coated with silica and an acrylic resin.

The present disclosure further provides a method for preparing the special powder coating for the super weather-resistant composite as described in the above technical solutions, including:

mixing the modified acrylate, the polyester resin, the IPDI adduct, the texturing agent, the transparent filler powder, the pigment, the toughening agent, the nano-alumina, and the conductive agent to obtain the special powder coating for the super weather-resistant composite.

In some embodiments, under the condition that the special powder coating for the super weather-resistant composite further includes the double-layer coated aluminum powder, the method further comprises binding after the mixing is completed.

The present disclosure further provides use of the special powder coating for the super weather-resistant composite as described in the above technical solutions in composite coating.

The present disclosure further provides a coating method, including:

subjecting a composite substrate to be coated to a surface treatment to obtain a pretreated composite substrate;

preheating the pretreated composite substrate to obtain a preheated substrate; and spraying and curing a powder coating in sequence on a surface of the preheated substrate;

wherein the preheating is conducted at a temperature of 80° C. to 170° C. for 6 min to 12 min, and the powder coating is the special powder coating for the super weather-resistant composite as described in the above technical solutions.

In some embodiments, the coating method further includes spraying a conductive primer before spraying the powder coating, wherein the conductive primer is one selected from the group consisting of an epoxy resin powder conductive primer, an epoxy polyester conductive primer, a pure polyester powder conductive primer, a polyurethane (PU) powder conductive primer, and an acrylic powder conductive primer.

The present disclosure provides the special powder coating for the super weather-resistant composite, including components of, in percentages by mass: 0% to 50% of a modified acrylate, 20% to 75% of a polyester resin, 15% to 20% of an isophorone diisocyanate (IPDI) adduct, 0.1% to 0.8% of a texturing agent, 4.3% to 22.7% of a transparent filler powder, 0.8% to 1.2% of a pigment, 0.1% to 0.2% of a toughening agent, 0.1% to 0.3% of nano-alumina, and 0% to 2% of a conductive agent, the components having a sum of mass percentages of 100%.

Compared with the prior art, the present disclosure has the following beneficial effects:

Compared with metal substrates, composites are microscopically uneven and their surface flatness is much worse than that of metals, resulting in a great influence of substrate temperature and formulation on the film forming performance of powder coatings. Existing powder coatings are unable to form a continuous and consistent film on composites due to uneven heating and uneven substrates, and cannot obtain coatings with excellent appearance and performance. In the present disclosure, the modified acrylate has low-temperature melting solidification and super durability; the polyester resin has low-temperature melting solidification and super durability; the IPDI adduct is a cross-linking agent for hydroxyl-containing saturated polyesters of the PU powder coatings; the effect of the texturing agent is to adjust the texture state; the effect of the transparent filler powder is to increase the hardness of the coating; the effect of the pigment is to color; the effect of the toughening agent is to increase the toughness of the coating; the effect of the nano-alumina is to promote the flow property, and the conductive agent can provide conductive properties. The special powder coating for the super weather-resistant composite can be applied to a non-conductive composite, effectively forms a strong bond with the surface of the composite, and is not prone to peeling or falling off. Moreover, the special powder coating for the super weather-resistant composite can realize low-temperature curing and meet the weather resistance requirements of outdoor applications.

Further, the special powder coating for the super weather-resistant composite further includes a double-layer coated aluminum powder, and the effect of the double-layer coated aluminum powder ensures the metallic flashing effect. At this time, a special metallic flash sand grain powder for the composite is provided.

The data in the examples show that the coating prepared by the special powder coating for the super weather-resistant composite on a composite surface can achieve excellent adhesion on the composite surface that is difficult to adhere with low surface energy, residual release agent, and uneven stress, and can also pass a cross-cut test and a high-pressure water gun impact test. The wear-resistant properties of the coating can meet the extreme application conditions of off-road and special environment vehicles, the fluid resistance and chemical resistance are excellent, and the weather resistance can meet the requirements of 4000 h of xenon lamps.

The present disclosure further provides a method for preparing the special powder coating for the super weather-resistant composite as described in the above technical solutions. The binding process is a special mixing procedure that can solve the adhesion problem between the base powder and the metallic pigment, so that the metallic pigment is bound to the base powder.

In the prior art, the spray gun in the electrostatic spray system charges the powder particles, generally with a negative charge, while the metal substrate is grounded and has a positive charge, forming an electrostatic field. At this time, the positive charge on the surface of the metal substrate attracts the negatively charged powder particles. When the powder particles are released from the spray gun and sprayed onto the surface of the metal substrate, they are attracted to the metal surface by the electrostatic field. The powder particles are evenly distributed on the metal surface and quickly adhere to the surface to form a thin film, so that the powder particles adsorbed on the metal surface begin to deposit and accumulate to form a continuous powder layer. The present disclosure further provides a coating method. In the present disclosure, the coating method solves the problems in powder spraying process of the non-conductive composites by combining the special powder coating for the super weather-resistant composite with preheating process. The special powder coating for the super weather-resistant composite can be used to solve the problem of powdering rate and powdering uniformity on the composite, and the performance of a resulting paint film can meet the assembly requirements of automotive exterior functional, including problems such as rough surface of the composite, slightly poor consistency of the surface state, and the coating after film formation is prone to shrinkage, pinholes, and blistering. A coating is provided with a high breadth of surface state of the coated substrate, can cover the defects of the substrate itself, adapt to different types of composites, and then form a flat and defect-free coating on the surface of the composite. Moreover, the obtained coating can achieve excellent adhesion to the composite surface, which is difficult to adhere due to low surface energy, residual release agent, and uneven stress, and can pass the cross-cut test and high-pressure water gun impact test. The coating shows that its wear resistance meets the extreme application conditions of off-road and special environment vehicles, its fluid resistance and chemical resistance are excellent, and its weather resistance meets the requirements for use under extreme conditions and other technical problems.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION OF THE EMBODIMENTS

Figure 1:
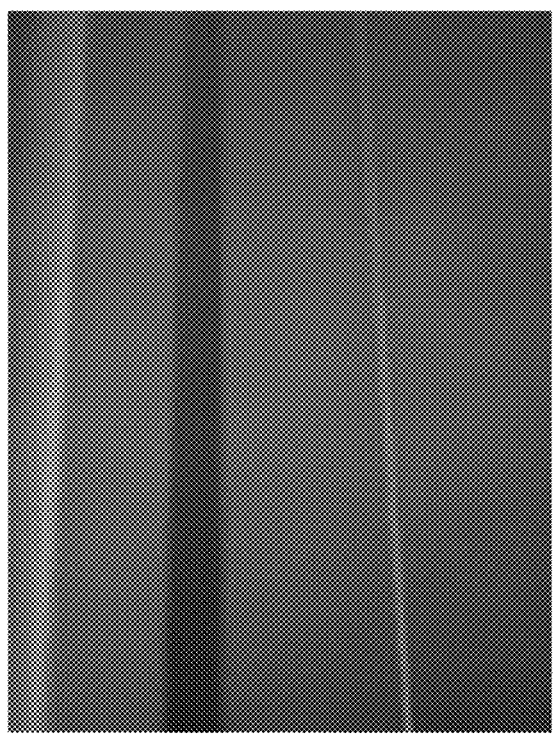
FIG. 1 shows an overall object picture of the coating prepared by the special powder coating for the super weather-resistant composite in Example 6.

The present disclosure provides a special powder coating for a super weather-resistant composite, including components of, in percentages by mass:

0% to 50% of a modified acrylate, 20% to 75% of a polyester resin, 15% to 20% of an isophorone diisocyanate (IPDI) adduct, 0.1% to 0.8% of a texturing agent, 4.3% to 22.7% of a transparent filler powder, 0.8% to 1.2% of a pigment, 0.1% to 0.2% of a toughening agent, 0.1% to 0.3% of nano-alumina, and 0% to 2% of a conductive agent, the components having a sum of mass percentages of 100%.

In the present disclosure, unless otherwise specified, all raw materials used are commercially available products conventional in the art.

In some embodiments of the present disclosure, the modified acrylate in the special powder coating for the super weather-resistant composite has a mass fraction of 40% to 48%, and the modified acrylate has low-temperature melting solidification and super durability.

In some embodiments of the present disclosure, the modified acrylate is PU acrylate or epoxy acrylate.

In some embodiments of the present disclosure, the epoxy acrylate is an epoxy-type acrylic powder coating resin, which can be prepared by referring to a method disclosed in CN115651473A.

In some embodiments of the present disclosure, the PU acrylate is prepared by a process including the following steps:

mixing isocyanate, polyester polyol, an acrylic monomer with a hydroxyl group, and an organic solvent, and conducting pre-polymerization to obtain a PU prepolymer; and mixing the PU prepolymer, a silane with a terminal double-bond, an acrylate monomer, an initiator, a chain transfer agent, and an organic solvent, and conducting free radical polymerization to obtain the super weather-resistant PU-modified acrylic resin.

In the present disclosure, unless otherwise specified, all raw materials used are commercially available products conventional in the art.

In the present disclosure, isocyanate, polyester polyol, an acrylic monomer with a hydroxyl group, and an organic solvent are mixed, and conducted pre-polymerization to obtain a PU prepolymer.

In some embodiments of the present disclosure, a molar ratio of the isocyanate, the polyester polyol, and the acrylic monomer with a hydroxyl group is in a range of 1:0.5:0.5 to 1:0.3:1.2, and preferably 1:0.5:1.

In some embodiments of the present disclosure, the acrylic monomer with a hydroxyl group includes at least one selected from the group consisting of hydroxyethyl methacrylate, hydroxypropyl methacrylate, hydroxyethyl acrylate, and hydroxypropyl acrylate.

In some embodiments of the present disclosure, the isocyanate includes at least one selected from the group consisting of hexamethylene diisocyanate, isophorone diisocyanate, toluene diisocyanate, diphenylmethane diisocyanate, and dicyclohexylmethane diisocyanate.

In some embodiments of the present disclosure, the polyester polyol includes at least one selected from the group consisting of polycarbonate polyol and polycaprolactone polyol.

In some embodiments of the present disclosure, the organic solvent includes at least one selected from the group consisting of dimethyl formamide (DMF), xylene, and 2-acetoxy-1-methoxypropane (PMA). There is no special limitation on the type of the organic solvent, as long as the raw materials can be completely dissolved.

In some embodiments the present disclosure, the pre-polymerization is conducted at a temperature of 85° C. to 95° C., and preferably 90° C., and the pre-polymerization is conducted for 3 h to 4 h.

In the present disclosure, after obtaining a PU prepolymer, the PU prepolymer, a silane with a terminal double bond, an acrylate monomer, an initiator, a chain transfer agent, and an organic solvent are mixed, and conducted free radical polymerization to obtain the super weather-resistant PU-modified acrylic resin.

In some embodiments of the present disclosure, a molar ratio of the PU prepolymer, the silane with a terminal double bond, and the acrylate monomer is in a range of 1:0.3:4 to 1:2:12, and preferably 3:1:16, 3:3:14, or 1:2:12.

In some embodiments of the present disclosure, the silane with a terminal double bond includes at least one selected from the group consisting of a silane with a terminal vinyl, a silane with a terminal acrylic, a silane with a terminal acryloxy, and a silane with a terminal methylacrylic, the silane with a terminal vinyl is Silok®3572 (vinyl silicone oil and octamethylcyclotetrasiloxane), the silane with a terminal acrylic is Shin-Etsu KBM-503 (3-methacryloxypropyltrimethoxysilane), the silane with a terminal acryloxy is Shin-Etsu KBM5103 (3-(acryloyloxy) propyltrimethoxysilane), and the silane with a terminal methylacrylic is Shin-Etsu KBM5803 (8-Methacryloxyoctyl trimethoxy silane).

In some embodiments of the present disclosure, the acrylate monomer includes at least one selected from the group consisting of methyl methacrylate, styrene, butyl acrylate, butyl methacrylate, acrylic acid, glycidyl methacrylate, isobornyl methacrylate, vinyl neodecanoate, cyclohexyl methacrylate, (meth)acrylic acid-modified polycaprolactone, ethyl acrylate, and ethylene glycol dimethacrylate.

In some embodiments of the present disclosure, the initiator is a peroxide, and preferably benzoyl peroxide (BPO), di-tert-butyl peroxide, or di-tert-amyl peroxide.

In some embodiments of the present disclosure, a molar ratio of the PU prepolymer to the initiator is in a range of 1:0.05 to 1:1, and preferably 3:0.43, 1:0.33, or 3:0.23.

In some embodiments of the present disclosure, the chain transfer agent is n-dodecyl mercaptan.

In some embodiments of the present disclosure, a molar ratio of the PU prepolymer to the chain transfer agent is in a range of 1:0.02 to 1:1, and preferably 1:0.05, 1:0.1, or 3:0.1.

In some embodiments of the present disclosure, the organic solvent includes at least one selected from the group consisting of xylene, PMA, toluene, ethylene glycol n-butyl ether, and solvent oil. There is no special limitation on the type of the organic solvent, as long as the raw materials can be completely dissolved.

In some embodiments of the present disclosure, the free radical polymerization is conducted at a temperature of 100° C. to 140° C., and preferably 130° C. to 135° C., and the free radical polymerization is conducted for 4 h to 7 h.

In some embodiments of the present disclosure, the organic solvent is preheated to a reaction temperature, and the acrylate monomer and the chain transfer agent are uniformly mixed to obtain a mixed solution; the mixed solution and the initiator are added dropwise into a preheated organic solvent at a uniform rate, respectively; when remaining ⅓ of the mass of the mixed solution, the PU prepolymer and the silane with a terminal double bond are added dropwise, and conducted the free radical polymerization, and the initiator is replenished during the free radical polymerization.

In some embodiments of the present disclosure, after the free radical polymerization is completed, the solvent is removed by vacuum, and a resulting mixture is discharged while hot to obtain the super weather-resistant PU-modified acrylic resin.

In some embodiments of the present disclosure, under the condition that the mass fraction of the modified acrylate in the special powder coating for the super weather-resistant composite is not 0, the polyester resin has a mass fraction of 20% to 24%; under the condition that the mass fraction of the modified acrylate in the special powder coating for the super weather-resistant composite is 0, the polyester resin has a mass fraction of 68% to 76%. The polyester resin has a lower glass transition temperature, and when combines with the PU acrylate, it balances the melt flow properties in each temperature range and provides certain durability.

In some embodiments of the present disclosure, the polyester resin is a saturated carboxyl polyester resin.

In some embodiments of the present disclosure, the IPDI adduct in the special powder coating for the super weather-resistant composite has a mass percentage of 15% to 18%, and the IPDI adduct is a cross-linking agent for hydroxyl-containing saturated polyester of the PU powder coating.

In some embodiments of the present disclosure, the IPDI adduct is VESTAGON® B 1530 (isocyanate).

In some embodiments of the present disclosure, the texturing agent in the special powder coating for the super weather-resistant composite has a mass percentage of 0.3% to 0.5%, and the effect of the texturing agent is to adjust the texture state.

In some embodiments of the present disclosure, the texturing agent is SW301 purchased from Foshan Nanhai Yisan Chemical Co., Ltd. (Nanhai Chemical SW301) (polytetrafluoroethylene).

In some embodiments of the present disclosure, the transparent filler powder in the special powder coating for the super weather-resistant composite has a mass percentage of 7.1% to 8.2%, and preferably 7.6% to 7.9%, and the effect of the transparent filler powder is to increase the hardness of the coating.

In some embodiments of the present disclosure, the transparent filler powder has a median particle size of 3.5 nm.

In some embodiments of the present disclosure, the composite nano-silicon is MINEX-7 (nepheline syenite).

In some embodiments of the present disclosure, the pigment in the special powder coating for the super weather-resistant composite has a mass percentage of 1% to 1.2%, and the effect of the pigment is to color.

In some embodiments of the present disclosure, the pigment is ORION COLOUR BLACK FW200 (carbon black).

In some embodiments of the present disclosure, the toughening agent in the special powder coating for the super weather-resistant composite has a mass percentage of 0.15% to 0.2%, and the effect of the toughening agent is to improve the toughness of the coating.

In some embodiments of the present disclosure, the toughening agent is MOWITAL B60H (polyvinyl butyral resin).

In some embodiments of the present disclosure, the nano-alumina in the special powder coating for the super weather-resistant composite has a mass percentage of 0.1% to 0.15%, and the effect of the nano-alumina is to promote flow properties.

In some embodiments of the present disclosure, the nano-alumina is AEROXIDE ALU-C (aluminium oxide).

In some embodiments of the present disclosure, the conductive agent in the special powder coating for the super weather-resistant composite has a mass percentage of 0.3% to 0.6%, and the effect of the conductive agent is to make the powder conductive and improve the powdering property. The appearance of the sprayed paint film is completely consistent, which can meet the application fields with extremely high requirements for product appearance consistency, such as consumer product exterior finishes and automotive A-level surfaces.

In some embodiments of the present disclosure, the conductive agent is a BC-L15 (conductive mica powder) inorganic charge equalizing agent purchased from Shanghai Junjiang New Materials Sales Co., Ltd.

In some embodiments of the present disclosure, the special powder coating for the super weather-resistant composite includes components of, in percentages by mass:

40% to 48% of the modified acrylate, 20% to 24% of the polyester resin, 15% to 18% of the IPDI adduct, 0.3% to 0.5% of the texturing agent, 7.1% to 8.2% of the transparent filler powder, 1% to 1.2% of the pigment, 0.15% to 0.2% of the toughening agent, 0.1% to 0.15% of the nano-alumina, and 0.3% to 0.6% of the conductive agent, or includes components of, in percentages by mass:

68% to 76% of the polyester resin, 15% to 18% of the IPDI adduct, 0.3% to 0.5% of the texturing agent, 7.1% to 8.2% of the transparent filler powder, 1% to 1.2% of the pigment, 0.15% to 0.2% of the toughening agent, 0.1% to 0.15% of the nano-alumina, and 0.3% to 0.6% of the conductive agent.

In some embodiments of the present disclosure, the special powder coating for the super weather-resistant composite as described in the above technical solutions further includes a double-layer coated aluminum powder, and the double-layer coated aluminum powder in the special powder coating for the super weather-resistant composite has a mass percentage of 0.5% to 5%, and preferably 0.5% to 3%, and the double-layer coated aluminum powder can provide a metallic flashing effect.

In some embodiments of the present disclosure, the double-layer coated aluminum powder has a particle size of 0.5 nm to 3 nm, and the double-layer coated aluminum powder is a layered double capsule, the layered double capsule being a non-floating aluminum powder double coated with silica and an acrylic resin.

In some embodiments of the present disclosure, the double-layer coated aluminum powder is ECKART PCU 1500 (aluminium powder).

The present disclosure further provides a preparation method of the special powder coating for the super weather-resistant composite, including the following steps:

mixing the modified acrylate, the polyester resin, the IPDI adduct, the texturing agent, the transparent filler powder, the pigment, the toughening agent, the nano-alumina, and the conductive agent to obtain the special powder coating for the super weather-resistant composite.

There is no special limitation on the specific manner of the mixing, and any manner well known to those skilled in the art may be used.

In some embodiments of the present disclosure, under the condition that the special powder coating for the super weather-resistant composite further includes the double-layer coated aluminum powder, the method further includes binding after the mixing is completed.

In some embodiments of the present disclosure, the binding is conducted by the following parameters: the binding is conducted at a temperature of 60° C. to 70° C.; and the binding can solve the adhesion problem between the base powder and the metallic pigment, such that the metallic pigment is connected to the base powder.

In some embodiments of the present disclosure, the method further includes: after the mixing, subjecting a resulting mixture to melt extrusion, tableting and cooling, initially crushing, grinding, and sieving in sequence to obtain the special powder coating for the super weather-resistant composite.

The present disclosure further provides use of the special powder coating for the super weather-resistant composite as described in the above technical solutions in composite coating.

The present disclosure further provides a coating method, including:

subjecting a composite substrate to be coated to a surface treatment to obtain a pretreated composite substrate;

preheating the pretreated composite substrate to obtain a preheated substrate; and spraying and curing a powder coating in sequence on a surface of the preheated substrate;

where the preheating is conducted at a temperature of 80° C. to 170° C., the preheating is conducted for 6 min to 12 min, and the powder coating is the special powder coating for the super weather-resistant composite as described in the above technical solutions.

In the present disclosure, a composite substrate to be coated is subjected to a surface treatment to obtain a pretreated composite substrate.

In some embodiments of the present disclosure, the composite substrate is made of a lightweight and low-density composite, and preferably is a roof of an off-road vehicle.

In some embodiments of the present disclosure, the surface treatment is conducted by a process including cleaning and degreasing in sequence, to ensure that the surface is smooth and flat, and free of dirt such as grease.

In some embodiments of the present disclosure, isopropyl alcohol is used for the degreasing.

In the present disclosure, after obtaining a pretreated composite substrate, the pretreated composite substrate is preheated to obtain a preheated substrate, where the preheating is conducted at a temperature of 80° C. to 170° C., and the preheating is conducted for 6 min to 12 min.

In some embodiments of the present disclosure, the preheating is conducted at a temperature of 100° C. to 150° C., and preferably 120° C. to 140° C., and the preheating is conducted for 8 min to 10 min.

In the present disclosure, after obtaining a preheated substrate, a powder coating is sprayed and cured in sequence on a surface of the preheated substrate, and the powder coating is the special powder coating for the super weather-resistant composite as described in the above technical solutions.

In some embodiments of the present disclosure, a spray gun used for the spraying is set according to different shapes of a workpiece; under the condition that the workpiece is a flat part, the spraying is conducted at a voltage of 80 kV, the spraying is conducted at a current of 30 μA; under the condition that the workpiece is a complex part with a groove, the spraying is conducted at a voltage of 80 kV, the spraying is conducted at a current of 22 μA; under the condition that the spraying is conducted by recoating, the spraying is conducted at a voltage of 40 kV, and the spraying is conducted at a current of 30 μA.

In some embodiments of the present disclosure, a preheating spraying is conducted at a temperature of 80° C. to 170° C., preferably 80° C. to 130° C., and more preferably 90° C. to 110° C.

In the present disclosure, during the spraying, the distance between the spray gun and the preheated substrate surface, the spraying angle, and the spraying speed should be appropriate to ensure the uniformity and quality of the coating.

In some embodiments of the present disclosure, under the condition that the special powder coating for the super weather-resistant composite does not include an inorganic charge equalizing agent, the spraying is conducted by continuously spraying several times at one time into a paint film (a principle of powdering at this time is thermal adsorption), and then curing; under the condition that the special powder coating for the super weather-resistant composite includes an inorganic charge equalizing agent, the spraying is conducted by spraying once into a thin paint film (the principle of powdering at this time is thermal adsorption, and this paint film turns the non-conductive composite into a conductive metal-like substrate, such that the powdering of the composite is as simple as that of the metal substrate, and the appearance of the paint film is not easy to misty), the sprayed special powder coating for a super weather-resistant composite is conductive by itself, and when a temperature of the workpiece is cooled below 90° C., then the thin paint film is sprayed several times until meet the film thickness requirements (the principle of powdering at this time is electrostatic adsorption), and then curing.

In some embodiments of the present disclosure, the curing is conducted at a temperature of 160° C. to 180° C., and the curing is conducted for 7 min to 20 min.

In some embodiments of the present disclosure, taking a film thickness of 60 μm to 90 μm as an example, a recovery system is provided during the spraying, and the special powder coating for the super weather-resistant composite has a dosage of (6-10) m²/kg; under the condition that without the recovery system, the special powder coating for the super weather-resistant composite has a dosage of (5-6) m²/kg.

In some embodiments of the present disclosure, the coating method further includes spraying a conductive primer before spraying the powder coating, wherein the conductive primer is one selected from the group consisting of an epoxy resin powder conductive primer, an epoxy polyester conductive primer, a pure polyester powder conductive primer, a PU powder conductive primer, and an acrylic powder conductive primer.

In some embodiments of the present disclosure, the epoxy resin powder conductive primer includes components of, in percentages by mass: 48% of bisphenol A epoxy resin, 12% of cycloaliphatic amine-modified curing agent, 1% of dimethyl imidazole, 3% of benzoin, 26% of CaSiO₃, 8% of pigment, and 2% of inorganic charge equalizing agent, the bisphenol A epoxy resin is Nan Ya epoxy resin NPES 902 (epoxy resin), the cycloaliphatic amine-modified curing agent is Epokukdo KD-420 (bisphenol A curing agent), the pigment is ORION COLOUR BLACK FW200, and the inorganic charge equalizing agent is BC-L15.

There is no special limitation on the preparation process of the conductive primer, and the process well known to those skilled in the art can be adopted.

The technical solutions of the present disclosure will be clearly and completely described below with reference to the examples of the present disclosure. Apparently, the described examples are merely some rather than all of the examples of the present disclosure. All other examples obtained by a person of ordinary skill in the art based on the examples of the present disclosure without creative efforts shall fall within the scope of the present disclosure.

In the examples, the PU acrylate was prepared by a process including the following steps:

1 mol of hexamethylene diisocyanate, 1.0 mol of hydroxyethyl methacrylate, 0.5 mol of polycarbonate polyol, and xylene were taken and mixed. A resulting mixture was subjected to prepolymerization at 85° C. for 4 h to obtain a PU prepolymer.

The xylene was preheated to 100° C. 0.5 mol of methyl methacrylate, 0.1 mol of butyl acrylate, 0.3 mol of glycidyl methacrylate, 0.1 mol of styrene, 0.1 mol of isobornyl methacrylate, and 0.01 mol of dodecyl mercaptan were mixed evenly to obtain a mixed solution. The mixed solution and 0.03 mol of an initiator BPO were added dropwise to a preheated xylene at a uniform rate, respectively, where the mixed solution was added dropwise for 3 h and the initiator was added dropwise for 3.5 h. When ⅓ of the mass of the mixed solution remained, 0.1 mol of the PU prepolymer and 0.2 mol of Silok®3572 were added dropwise to a reaction system for 1.5 h. A resulting system was then subjected to free radical polymerization at 100° C., and heat preservation was conducted for 1 h. 0.003 mol of an initiator was replenished and heat preservation was conducted for another 1 h. After the reaction was completed, vacuum was conducted until all the solvent had been removed, followed by a resulting material was discharged while hot to obtain the PU acrylate.

Preparation of epoxy acrylate: referring to Example 1 in CN115651473A.

EXAMPLES

The raw material compositions of the special powder coatings for a super weather-resistant composite provided by the present disclosure are shown in Table 1.

TABLE 1

| Raw material composition of the special powder coating for the super weather-resistant composite (wt %) | | | | | | | | | | |
|---|---|---|---|---|---|---|---|---|---|---|
| Raw material trademark | Name of Raw Material | Example 1 | Example 2 | Example 3 | Example 4 | Example 5 | Example 6 | Example 7 | Example 8 | Example9 |
| Self-made | PU acrylate | 48 | 48 | 48 | 48 | 40 | 48 | 48 | — | — |
| Uralac ® P 6504 | Saturated carboxyl polyester resin | 24 | 24 | 24 | 24 | 20 | 24 | 24 | 72 | 24 |
| Self-made | Epoxy acrylate | — | — | — | — | — | — | — | — | 48 |
| VESTAGON ® B 1530 | IPDI adduct | 18 | 18 | 18 | 18 | 15 | 18 | 18 | 18 | 18 |
| Nanhai Chemical SW301 | Texturing agent | 0.3 | 0.5 | 0.5 | 0.8 | 0.5 | 0.5 | 0.5 | 0.5 | 0.5 |
| Minex 7 | Transparent filler powder | 7.9 | 8.2 | 7.7 | 7.4 | 22.7 | 7.6 | 7.1 | 7.7 | 7.7 |
| ORION COLOUR BLACK FW200 | Pigment | 1 | 1 | 1 | 1 | 1 | 1 | 1 | 1 | 1 |
| MOWITAL B60H | Toughening agent | 0.2 | 0.2 | 0.2 | 0.2 | 0.2 | 0.2 | 0.2 | 0.2 | 0.2 |
| AEROXIDE ALU-C | Nano-alumina | 0.1 | 0.1 | 0.1 | 0.1 | 0.1 | 0.1 | 0.1 | 0.1 | 0.1 |
| BC-L15 inorganic charge equalizing agent | Conductive agent | — | — | — | — | — | 0.6 | 0.6 | — | — |
| ECKART PCU 1500 | Double-layer coated aluminum powder | 0.5 | — | 0.5 | 0.5 | 0.5 | — | 0.5 | 0.5 | 0.5 |

In the examples, the special powder coatings for a super weather-resistant composite were prepared by a process as follows:

Raw materials were mixed. A resulting mixture was then subjected to melt extrusion, tableting and cooling, initially crushing, grinding, and sieving in sequence to obtain the special powder coating for the super weather-resistant composite. Under the condition that the special powder coating for the super weather-resistant composite further included a double-layer coated aluminum powder, the resulting mixture was bound (70° C.) after the mixing was completed.

Painting a roof of an off-road vehicle was performed as follows:

Pretreatment: a substrate to be coated was subjected to a surface treatment, including cleaning and degreasing (wiping with isopropyl alcohol).

A spray gun was set according to different shapes of a workpiece, a flat part, a voltage of 80 kV and a current of 30 μA.

Preheating: at 130° C. for 10 min, a spraying temperature of 95° C.

Spraying: the powder coating was evenly sprayed onto a surface of a substrate using a spraying device, and a recovery system was provided during spraying, where a dosage of the special powder coating for the super weather-resistant composite was 10 m²/kg (the powders in Examples 1 to 5 were non-conductive powders, which were continuously sprayed several times at one time into paint films using a thermal spraying process, then cured; while the powders in Examples 6 and 7 were conductive powders, which were sprayed once into thin paint films, and when a temperature of the workpiece was cooled to 90° C., and then the thin paint films were sprayed several times until meet the film thickness requirements).

Curing: at 180° C. for 20 min.

The performance of a resulting coating was tested, and the results are shown in Table 2. It can be seen that Examples 6 and 7 have the best performance, and after the addition of BC-L15, the powder itself becomes conductive and easier to spray, which can completely solve the misting problem.

TABLE 2

Coating performance test results

| Performance | Test standard | Example 1 | Example 2 | Example 3 | Example 4 | Example 5 | Example 6 | Example 7 | Example 8 | Example 9 |
|---|---|---|---|---|---|---|---|---|---|---|
| Glossiness | ASTM D523-2018 | 6-8 | 4-6 | 4-6 | 3-5 | 2-3 | 3-4 | 3-4 | 3-6 | 2-4 |
| Hardness | GB/T 6739-2006 | ≥5H | ≥6H | ≥6H | ≥6H | ≥6H | ≥6H | ≥6H | ≥3H | ≥3H |
| Wear resistance | ISO 7784-2:2016 CS-17, 1000 revolutions, 1000 g | ≤15 mg | ≤9 mg | ≤6 mg | ≤6 mg | ≤5 mg | ≤5 mg | ≤5 mg | 20-40 mg | 40-60 mg |
| Adhesion | ASTM3 359-2022 | 5B | 5B | 5B | 5B | 5B | 5B | 5B | 4B-5B | 4B-5B |
| Scratch resistance | FLTM BO 162-01 | PASS | PASS | PASS | PASS | PASS | PASS | PASS | PASS | PASS |
| High-pressure water washing resistance | FLTM BI 106-04 | PASS | PASS | PASS | PASS | PASS | PASS | PASS | PASS | PASS |
| Water resistance | FLTM BI 104-01, 240 h | PASS | PASS | PASS | PASS | PASS | PASS | PASS | PASS | PASS |
| Wet resistance | FLTM BI 104-02, 240 h, AATCC evaluation procedure 1/ISO 105-A02) | PASS | PASS | PASS | PASS | PASS | PASS | PASS | Rating 4 | Rating 4/5 |
| Heat resistance | 7 d at 80 +/− 2° C., AATCC evaluation procedure 1/ISO 105-A02) | PASS | PASS | PASS | PASS | PASS | PASS | PASS | Rating 4/5 | Rating 4 |

TABLE 2-continued

| | | Coating performance test results | | | | | | | | |
| Performance | Test standard | Exam-ple 1 | Exam-ple 2 | Exam-ple 3 | Exam-ple 4 | Exam-ple 5 | Exam-ple 6 | Exam-ple 7 | Exam-ple 8 | Exam-ple 9 |
|---|---|---|---|---|---|---|---|---|---|---|
| Weather resistance | GB/T 1865-2009, 4000 h, adhesion test after weathering test | PASS | PASS | PASS | PASS | PASS | PASS | PASS | PASS | PASS |
| Coverage of substrate defect | — | Covering pinholes and small textures in substrate | Covering pinholes and small textures in substrate | Covering pinholes and small textures in substrate | Covering pinholes and small textures in substrate | Covering pinholes and small textures in substrate | Covering pinholes and small textures in substrate | Covering pinholes and small textures in substrate | Covering pinholes and small textures in substrate | Covering pinholes and small textures in substrate |
| Flatness of paint film | — | Overall smooth paint film with relatively consistent texture | Overall smooth paint film with relatively uniform texture | Overall smooth paint film with relatively consistent texture | Overall smooth paint film with relatively consistent texture | Overall smooth paint film with relatively consistent texture | Overall smooth paint film with completely consistent texture | Overall smooth paint film with completely consistent texture | Overall smooth paint film with relatively consistent texture | Overall smooth paint film with relatively consistent texture |
| Appearance | — | Metallic flashing | Monochrome | Metallic flashing | Metallic flashing | Metallic flashing | Monochrome | Metallic flashing | Metallic flashing | Metallic flashing |

Figure 2:
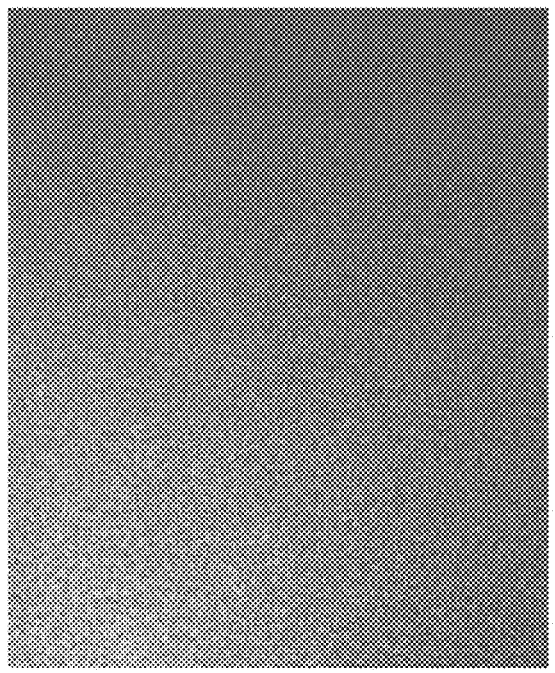
FIG. 2 shows a partially enlarged picture of the coating prepared by the special powder coating for the super weather-resistant composite in Example 6.

FIG. 1 shows an overall object picture of the coating prepared by the special powder coating for the super weather-resistant composite in Example 6. FIG. 2 shows a partially enlarged picture of the same.

Figure 3:
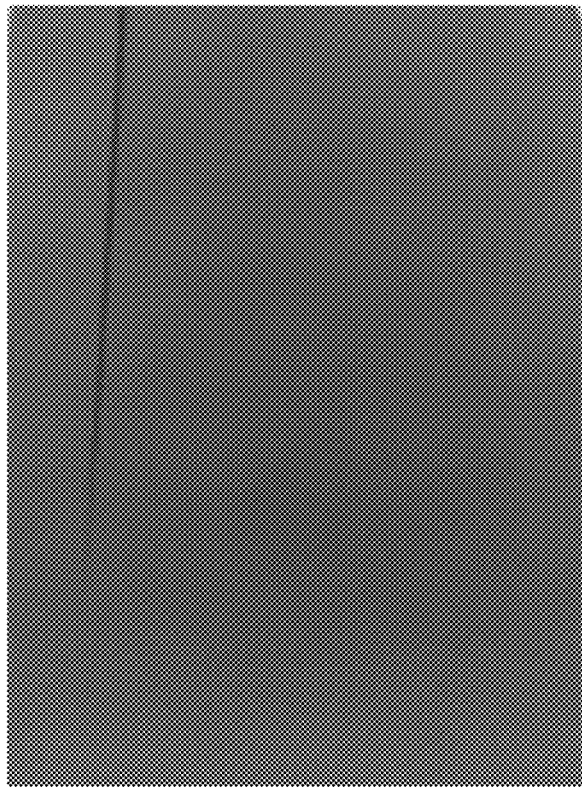
FIG. 3 shows an overall object picture of the coating prepared by the special powder coating for the super weather-resistant composite in Example 7.
Figure 4:
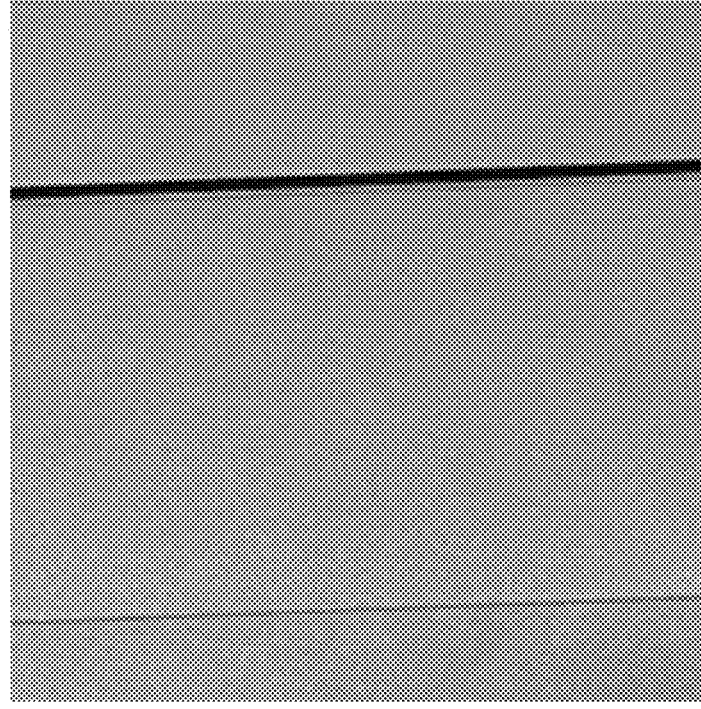
FIG. 4 shows a partially enlarged picture of the coating prepared by the special powder coating for the super weather-resistant composite in Example 7.

FIG. 3 shows an overall object picture of the coating prepared by the special powder coating for the super weather-resistant composite in Example 7. FIG. 4 shows a partially enlarged picture of the same. As shown in FIG. 1 to FIG. 4, the coatings prepared by the special coating powders for a super weather-resistant composite of Examples 6 and 7 have a smooth appearance and completely consistent textures.

Comparative Example 2

Figure 5:
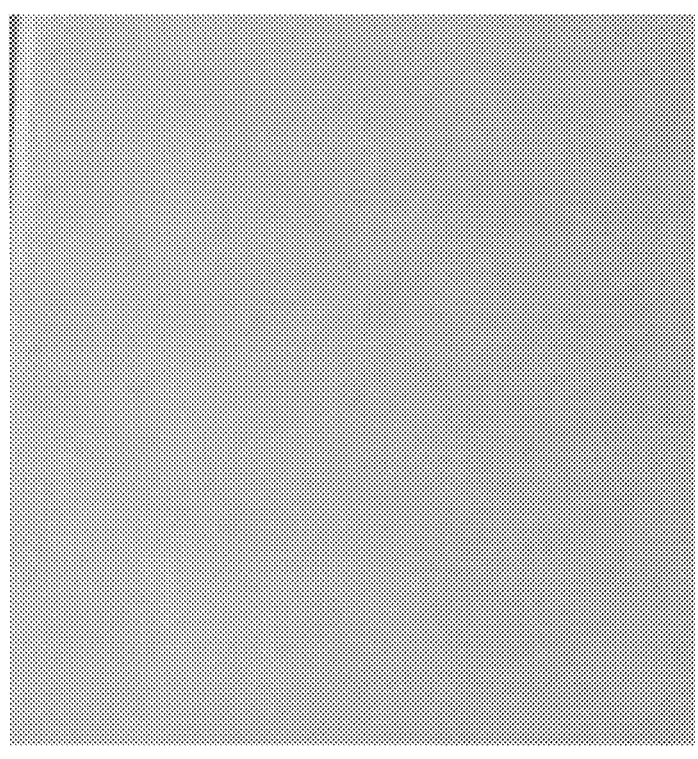
FIG. 5 shows an object picture of the coating prepared in Comparative Example 2.

The special powder coating for the super weather-resistant composite prepared in Example 6 was used for spraying, and the substrate was not subjected to any preheating treatment. The object picture is shown in FIG. 5, and it can be seen that without preheating, the surface of the substrate cannot hold the powder coating.

Comparative Example 3

Figure 6:
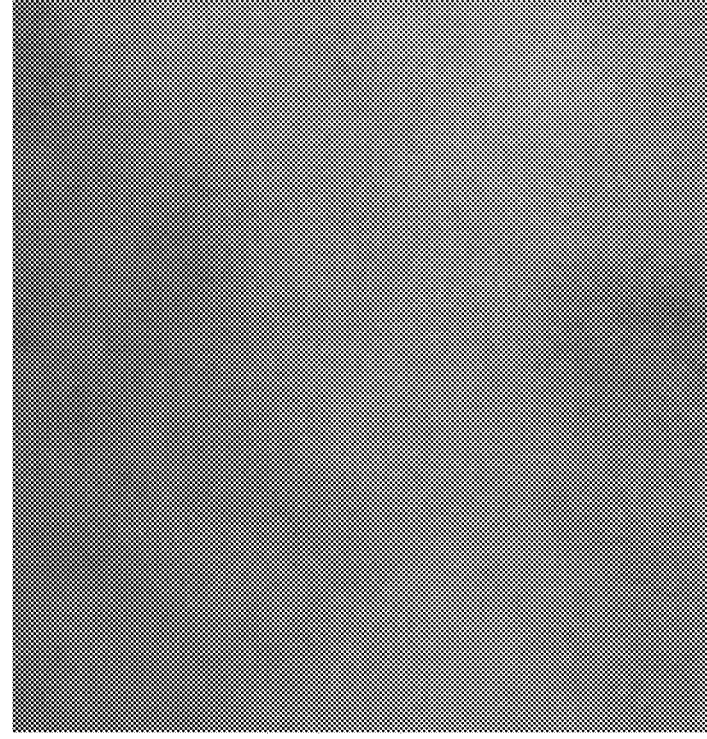
FIG. 6 shows an object picture of the coating prepared in Comparative Example 3.

The special powder coating for the super weather-resistant composite prepared in Example 6 was used for spraying, and the substrate was subjected to a preheating treatment at 60° C. The object picture is shown in FIG. 6, and it can be seen that the substrate cannot be completely covered due to the poor powdering.

Comparative Example 4

Figure 7:
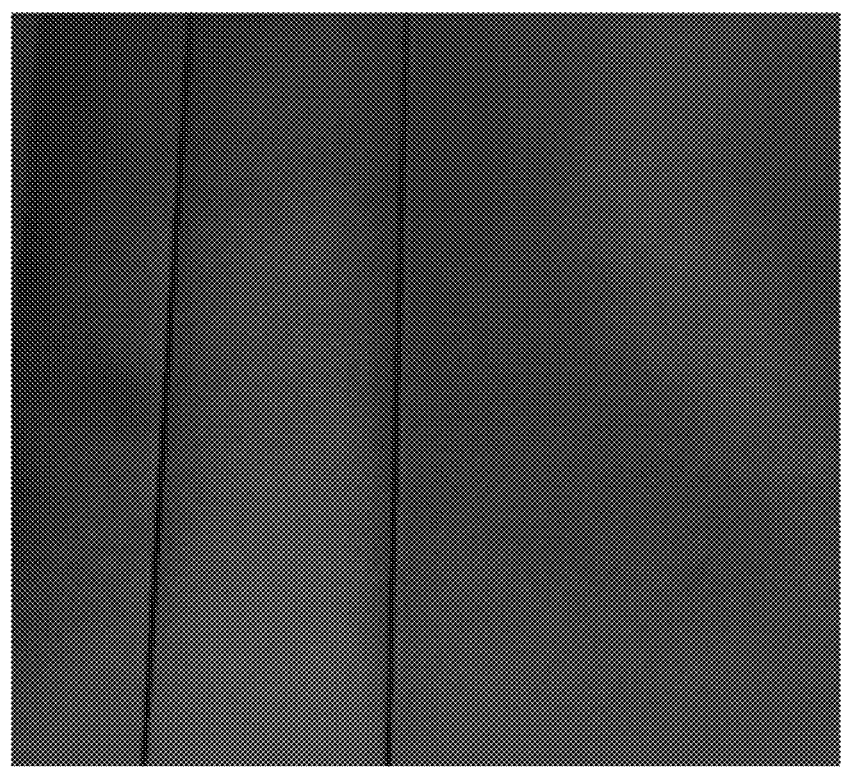
FIG. 7 shows an object picture of the coating prepared in Comparative Example 4.

The special powder coating for the super weather-resistant composite prepared in Example 6 was used for spraying, and the substrate was subjected to a preheating treatment at 70° C. The object picture is shown in FIG. 7, and it can be seen that it is easy to occur the problem of uneven powdering.

Comparative Example 5

Figure 8:
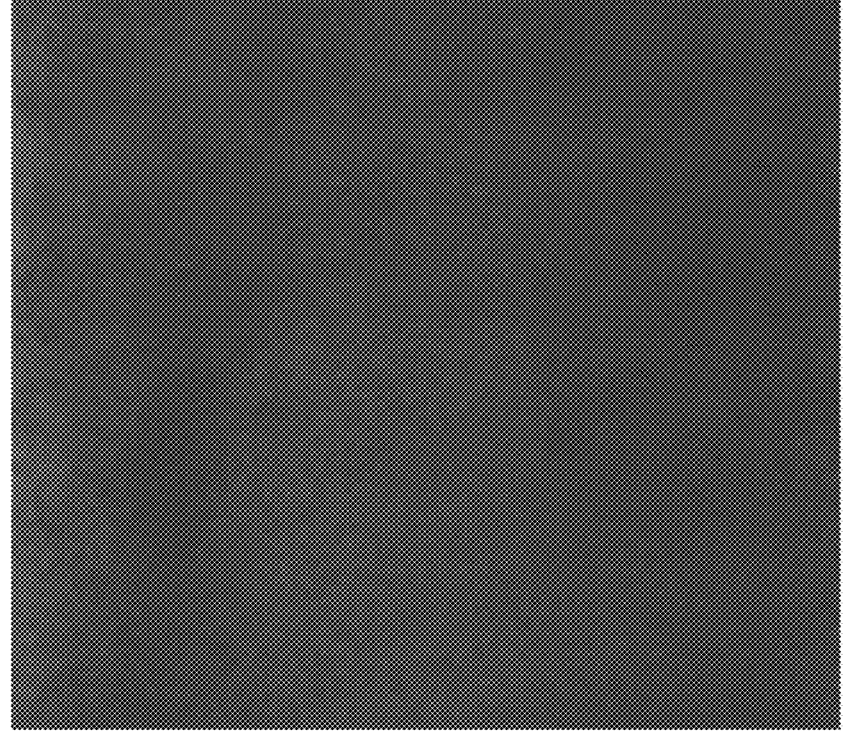
FIG. 8 shows an object picture of the coating prepared in Comparative Example 5.

The special powder coating for the super weather-resistant composite prepared in Example 6 was used for spraying, and the substrate was subjected to a preheating treatment at 180° C. The object picture is shown in FIG. 8, and it can be seen that due to the high preheating temperature, the powder does not flow levelly on the substrate and reacts and solidifies quickly, resulting in an appearance with inconsistent texture.

Comparative Example 6

Figure 9:
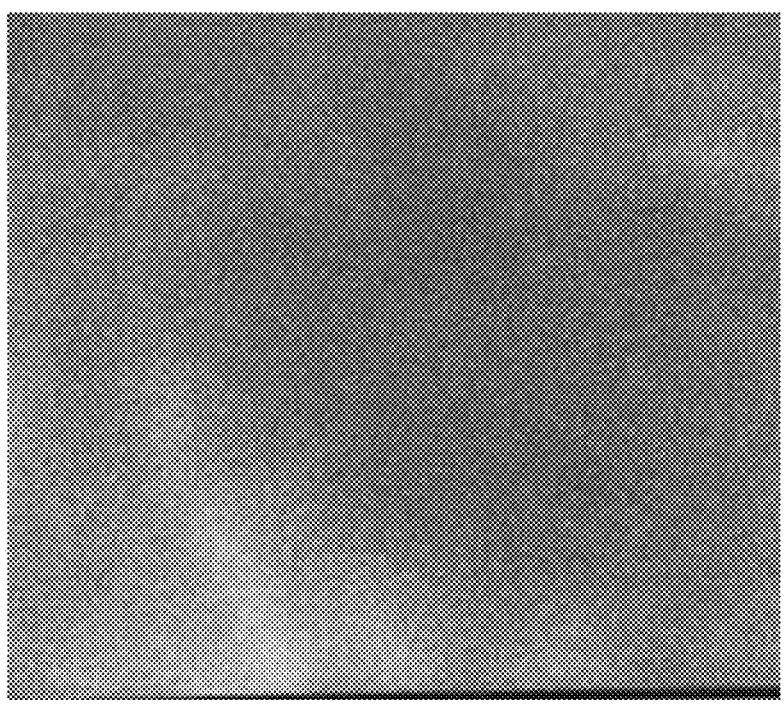
FIG. 9 shows an object picture of the coating prepared in Comparative Example 6.

The special powder coating for the super weather-resistant composite prepared in Example 6 was used for spraying, the thickness of the powder spraying film was too thin, and the object picture is shown in FIG. 9.

Comparative Example 7

Figure 10:
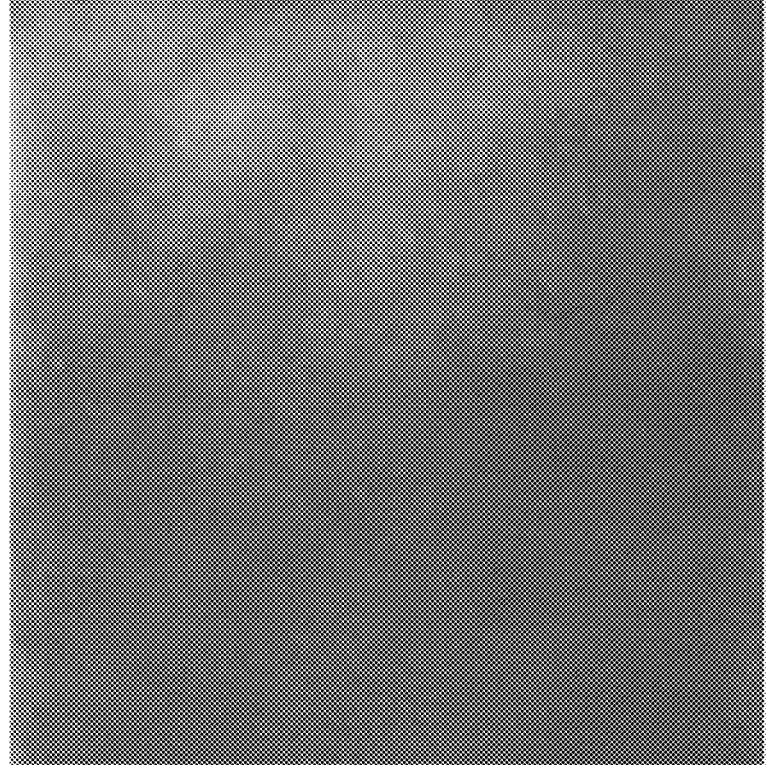
FIG. 10 shows an object picture of the coating prepared in Comparative Example 7.

The special powder coating for the super weather-resistant composite prepared in Example 6 was used for spraying, the number of the powder spraying was few, and the object picture is shown in FIG. 10.

Comparative Example 8

Figure 11:
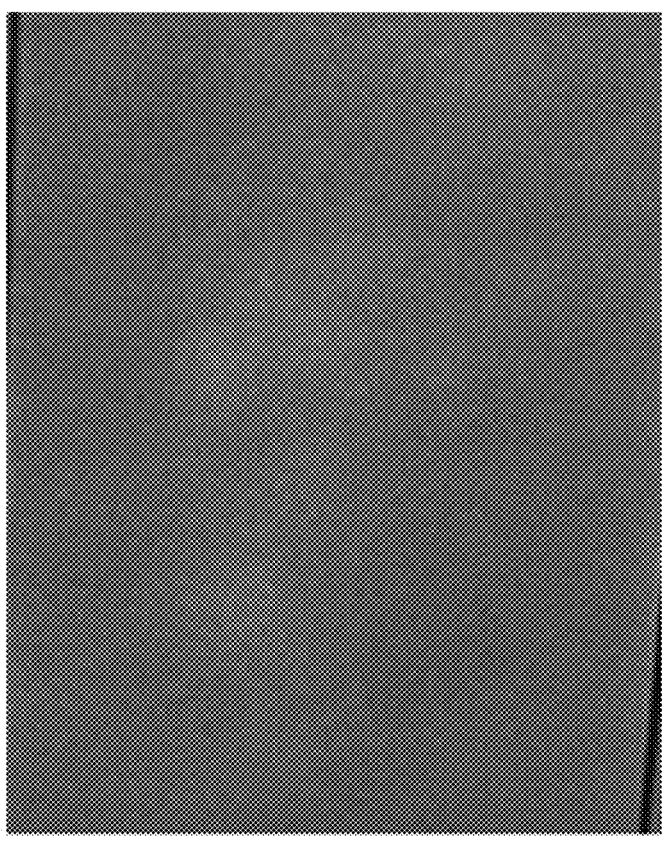
FIG. 11 shows an object picture of the coating prepared in Comparative Example 8.

The special powder coating for the super weather-resistant composite prepared in Example 6 was used for spraying, and the substrate of the powder spraying had uneven temperature, and the object picture is shown in FIG. 11.

As shown in FIG. 9 to FIG. 11, too thin a film thickness, too few spray numbers, and uneven substrate temperature can cause the powder to melt and level better at locations where the substrate temperature is higher than at locations where the temperature is lower, causing localized shiny areas.

Comparative Example 9 (Conductive Liquid+Preheating Process)

Pretreatment: a substrate to be coated was subjected to a surface treatment, including cleaning and degreasing (wiping with isopropyl alcohol).

Spraying conductive liquid: BC-S01 water-based conductive liquid (Shanghai Junjiang New Materials) was evenly sprayed on a workpiece with an air spray gun, with a film thickness of 20 μm.

Conductive liquid drying: drying at 100° C. for 5 min.

A spray gun was set according to different shapes of a workpiece, a flat part, a voltage of 80 kV and a current of 30 μA.

Preheating: at 140° C. for 10 min, a spraying temperature of 110° C.

Spraying: the powder coating of Example 6 was evenly sprayed onto a surface of a substrate using a spraying device, and a recovery system was provided during the spraying, where a dosage of the special powder coating for the super weather-resistant composite was 10 m²/kg.

Curing: at 180° C. for 20 min.

Figure 12:
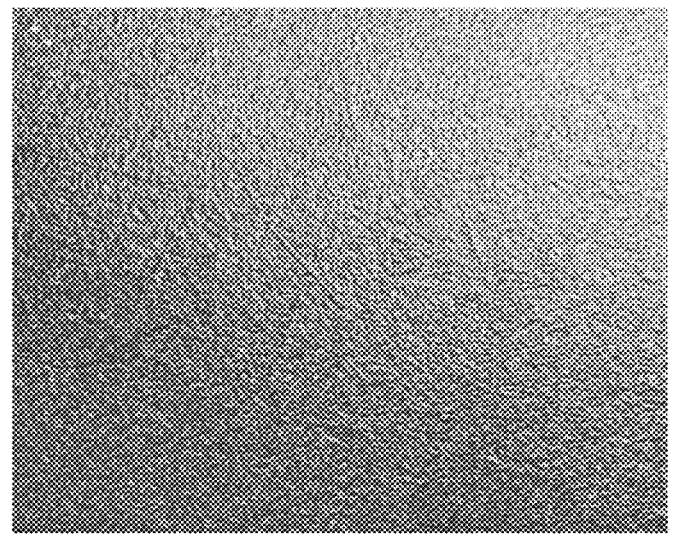
FIG. 12 shows an object picture of the coating prepared in Comparative Example 9.

A resulting coating is shown in FIG. 12. A surface coating from this process is basically uniform. Attention should be paid to the uniform spraying of the conductive liquid and the control of the film thickness. The film should not be too thick to avoid uneven traces of the conductive liquid.

Comparative Example 10 (Room-Temperature Spraying Process with Antistatic Agent)

Pretreatment: a substrate to be coated was subjected to a surface treatment, including cleaning and degreasing (wiping with isopropyl alcohol).

Spraying antistatic agent: pw-5100 water-based conductive crosslinking agent was evenly sprayed on a workpiece with an air spray gun, with a film thickness of 20 μm.

The substrate was blow-dried with an air gun.

Spraying: the powder coating of Example 6 was evenly sprayed onto a surface of a substrate using a spraying device, and a recovery system was provided during the spraying, where a dosage of the special powder coating for the super weather-resistant composite was 10 m²/kg. The distance between the spray gun and the substrate surface, the spraying angle, and the spraying speed should be appropriate to ensure the uniformity and quality of the coating.

Curing: at 180° C. for 20 min.

Figure 13:
FIG. 13 shows an object picture of the coating prepared in Comparative Example 10.

A resulting coating is shown in FIG. 13. A surface coating of this process is basically uniform.

In summary, the performance summary and comparison of the special powder coatings for a super weather-resistant composite and conventional powder coatings is shown in Table 3.

TABLE 3

Performance summary and comparison of the special powder coatings for a super weather-resistant composite and conventional powder coatings

| Performance | Test standard | Conventional powder | Special monochrome powder for composites (excluding double-layer coated aluminum powder) | Metallic flashing grain powder for composites (including double-layer coated aluminum powder) |
| --- | --- | --- | --- | --- |
| Spraying process | — | Being unable to form a defect-free paint film on composites through conventional spraying | Being able to spray | Being able to spray |
| Hardness | GB/T 6739-2006 | 2H | ≥6H | ≥6H |
| Wear resistance | ISO 7784-2: 2016 | CS10 grinding wheel (fine), 1000 revolutions, abrasion loss ≤40 mg | CS10 grinding wheel (fine), 1000 revolutions, abrasion loss ≤25 mg | CS17 grinding wheel, 1000 revolutions, abrasion loss ≤25 mg |
| Scratch resistance | FLTM BO 162-01 | Not satisfied | Satisfied | Satisfied |
| High-pressure water washing resistance | FLTM BI 106-04 | Not satisfied | Satisfied | Satisfied |
| Water resistance | FLTM BI 104-01, 240 h, | Not satisfied | Satisfied | Satisfied |
| Wet resistance | FLTM BI 104-02, AATCC evaluation, 240 h, procedure 1/ISO 105-A02) | Not satisfied | Satisfied | Satisfied |
| Heat resistance | 7 d at 80 +/− 2° C., AATCC evaluation procedure 1/ISO 105-A02) | Not satisfied | Satisfied | Satisfied |
| Weather resistance | GB/T 1865-2009, adhesion added test after weathering test | Not satisfied | 4000 h | 4000 h |
| Coverage of substrate defect | — | Being unable to cover substrate defects, the paint film forms pinholes, shrinkage holes, and shows unevenness on the composite | Covering pinholes and small textures in substrate | Covering pinholes and small textures in substrate |

TABLE 3-continued

Performance summary and comparison of the special powder coatings for
a super weather-resistant composite and conventional powder coatings

| Performance | Test standard | Conventional powder | Special monochrome powder for composites (excluding double-layer coated aluminum powder) | Metallic flashing grain powder for composites (including double-layer coated aluminum powder) |
|---|---|---|---|---|
| Appearance | — | Different | Monochrome | Metallic flashing |
| Preparation process | — | Different | Without binding | With binding |

Example 10 Conductive Base Powder

The components are shown in Table 4.

TABLE 4

Composition of conductive base powder

| Raw material trademark | Name of Raw Material | wt % |
|---|---|---|
| Nan Ya epoxy resin NPES 902 | Bisphenol A epoxy resin | 48 |
| Epokukdo KD-420 | Cycloaliphatic amine-modified curing agent | 12 |
| Dimethylimidazole | Dimethylimidazole | 1 |
| Benzoin | Benzoin | 3 |
| Siliceous limestone | $CaSiO_3$ | 26 |
| ORION COLOUR BLACK FW200 | Pigment | 8 |
| BC-L15 | Inorganic charge equalizing agent | 2 |

Spraying process (base powder+top powder, two coating and one baking):

Pretreatment: a substrate to be coated was subjected to a surface treatment, including cleaning and degreasing (wiping with isopropyl alcohol).

A spray gun was set according to different shapes of a workpiece, a flat part, a voltage of 80 kV and a current of 30 μA.

Preheating: at 140° C. for 10 min, at a spraying temperature of 110° C.

Spraying conductive base powder: a conductive base powder was sprayed evenly onto a surface of a substrate using a spraying device to form a thin film, and a powdering mechanism at this time was thermal adsorption.

Spraying the top powder (Examples 1 to 9): after spraying the conductive base powder, a temperature of the workpiece was cooled to below 90° C., and the special powder coating for the super weather-resistant composite was sprayed several numbers until a paint film reached the film thickness requirement, and a powdering mechanism at this time was electrostatic adsorption.

Curing: at 180° C. for 20 min.

The test results of the coatings are shown in Table 5.

TABLE 5

Test results for coating performance of two coating and one baking

| Performance | Test standard | Example 10 + Example 1 | Example 10 + Example 2 | Example 10 + Example 3 | Example 10 + Example 4 | Example 10 + Example 5 | Example 10 + Example 6 | Example 10 + Example 7 | Example 10 + Example 8 | Example 10 + Example 9 |
|---|---|---|---|---|---|---|---|---|---|---|
| Glossiness | ASTM D523-2018 | 6-8 | 4-6 | 4-6 | 3-5 | 2-3 | 3-4 | 3-4 | 3-6 | 2-4 |
| Hardness | GB/T 6739-2006 | ≥5H | ≥6H | ≥6H | ≥6H | ≥6H | ≥6H | ≥6H | ≥3H | ≥3H |
| Wear resistance | ISO 7784-2: 2016 CS-17, 1000 revolutions, 1000 g | ≤15 mg | ≤9 mg | ≤6 mg | ≤6 mg | ≤5 mg | ≤5 mg | ≤5 mg | 20-40 mg | 40-60 mg |
| Adhesion | ASTM3359-2022 | 5B | 5B | 5B | 5B | 5B | 5B | 5B | 5B | 5B |
| Scratch resistance | FLTM BO 162-01 | PASS | PASS | PASS | PASS | PASS | PASS | PASS | PASS | PASS |
| High-pressure water washing resistance | FLTM BI 106-04 | PASS | PASS | PASS | PASS | PASS | PASS | PASS | PASS | PASS |
| Water resistance | FLTM BI 104-01, 240 h | PASS | PASS | PASS | PASS | PASS | PASS | PASS | PASS | PASS |

TABLE 5-continued

| | | Test results for coating performance of two coating and one baking | | | | | | | | |
|---|---|---|---|---|---|---|---|---|---|---|
| Perfor-mance | Test standard | Exam-ple 10 + Exam-ple 1 | Exam-ple 10 + Exam-ple 2 | Exam-pls 10 + Exam-ple 3 | Exam-ple 10 + Exam-ple 4 | Exam-ple 10 + Exam-ple 5 | Exam-ple 10 + Exam-ple 6 | Exam-ple 10 + Exam-ple 7 | Exam-ple 10 + Exam-ple 8 | Exam-ple 10 + Exam-ple 9 |
| Wet resistance | FLTM BI 104-02, 240 h, AATCC evaluation procedure 1/ISO 105-A02) | PASS | PASS | PASS | PASS | PASS | PASS | PASS | Rating 4 | Rating 4/5 |
| Heat resistance | 7 d at 80 +/− 2° C., AATCC evaluation procedure 1/ISO 105-A02) | PASS | PASS | PASS | PASS | PASS | PASS | PASS | Rating 4/5 | Rating 4 |
| Weather resistance | GB/T 1865-2009, 4000 h, adhesion added test after weathering test | PASS | PASS | PASS | PASS | PASS | PASS | PASS | PASS | PASS |
| Coverage of substrate defect | — | Covering pinholes and small textures in substrate | Covering pinholes and small textures in substrate | Covering pinholes and small textures in substrate | Covering pinholes and small textures in substrate | Covering pinholes and small textures in substrate | Covering pinholes and small textures in substrate | Covering pinholes and small textures in substrate | Covering pinholes and small textures in substrate | Covering pinholes and small textures in substrate |
| Flatness of paint film | — | Overall smooth paint film with completely consistent texture | Overall smooth paint film with completely consistent texture | Overall smooth paint film with completely consistent texture | Overall smooth paint film with completely consistent texture | Overall smooth paint film with completely consistent texture | Overall smooth paint film with completely consistent texture | Overall smooth paint film with completely consistent texture | Overall smooth paint film with completely consistent texture | Overall smooth paint film with completely consistent texture |
| Appearance | — | Metallic flashing | Monochrome | Metallic flashing | Metallic flashing | Metallic flashing | Monochrome | Metallic flashing | Metallic flashing | Metallic flashing |

The above described are merely preferred embodiments of the present disclosure rather than limitations to the present disclosure in any form. It should be noted that those of ordinary skill in the art may further make several improvements and modifications without departing from the principle of the present disclosure, but such improvements and modifications should be deemed as falling within the scope of the present disclosure.

What is claimed is:

1. A special powder coating for a weather-resistant composite, comprising components of, in percentages by mass: 40% to 48% of a modified acrylate, 20% to 24% of a polyester resin, 15% to 20% of an adduct derived from isophorone diisocyanate (IPDI), 0.1% to 0.8% of a texturing agent, 4.3% to 22.7% of a transparent filler powder, 0.8% to 1.2% of a pigment, 0.1% to 0.2% of a toughening agent, 0.1% to 0.3% of alumina, and 0% to 2% of a conductive agent, the components having a sum of mass percentages of 100%; wherein the modified acrylate is polyurethane acrylate; the adduct derived from IPDI is a polyisocyanate adduct with &-Caprolactam blocked NCO-groups; and the polyester resin is a saturated carboxyl polyester resin.

2. The special powder coating for the weather-resistant composite of claim 1, comprising the components of, in percentages by mass:

40% to 48% of the modified acrylate, 20% to 24% of the polyester resin, 15% to 18% of the adduct derived from IPDI, 0.3% to 0.5% of the texturing agent, 7.1% to 8.2% of the transparent filler powder, 1% to 1.2% of the pigment, 0.15% to 0.2% of the toughening agent, 0.1% to 0.15% of the alumina, and 0.3% to 0.6% of the conductive agent.

3. The special powder coating for the weather-resistant composite of claim 1, further comprising a double-layer coated aluminum powder, wherein the double-layer coated aluminum powder in the special powder coating for the weather-resistant composite has a mass percentage of 0.5% to 5%.

4. The special powder coating for the weather-resistant composite of claim 3, wherein the double-layer coated aluminum powder has a particle size of 0.5 nm to 3 nm, and the double-layer coated aluminum powder is a layered double capsule, the layered double capsule being a non-floating aluminum powder double coated with silica and an acrylic resin.

5. A method for preparing the special powder coating for the weather-resistant composite of claim 1, comprising: mixing the modified acrylate, the polyester resin, the adduct derived from isophorone diisocyanate (IPDI), the texturing agent, the transparent filler powder, the pigment, the toughening agent, the alumina, and the conductive agent to obtain the special powder coating for the weather-resistant composite.

6. The method of claim 5, wherein under the condition that the special powder coating for the weather-resistant composite further comprises the double-layer coated aluminum powder, the method further comprises binding after the mixing is completed.

7. The method of claim 5, wherein the special powder coating comprises the components of, in percentages by mass:

40% to 48% of the modified acrylate, 20% to 24% of the polyester resin, 15% to 18% of the adduct derived from isophorone diisocyanate (IPDI), 0.3% to 0.5% of the texturing agent, 7.1% to 8.2% of the transparent filler powder, 1% to 1.2% of the pigment, 0.15% to 0.2% of the toughening agent, 0.1% to 0.15% of the alumina, and 0.3% to 0.6% of the conductive agent.

8. The method of claim 5, wherein the special powder coating comprises the components of, in percentages by mass:

68% to 76% of the polyester resin, 15% to 18% of the adduct derived from IPDI, 0.3% to 0.5% of the texturing agent, 7.1% to 8.2% of the transparent filler powder, 1% to 1.2% of the pigment, 0.15% to 0.2% of the toughening agent, 0.1% to 0.15% of the alumina, and 0.3% to 0.6% of the conductive agent.

9. The method of claim 5, wherein the special powder coating comprises a double-layer coated aluminum powder, wherein the double-layer coated aluminum powder in the special powder coating for the weather-resistant composite has a mass percentage of 0.5% to 5%.

10. The method of claim 5, wherein the double-layer coated aluminum powder has a particle size of 0.5 nm to 3 nm, and the double-layer coated aluminum powder is a layered double capsule, the layered double capsule being a non-floating aluminum powder double coated with silica and an acrylic resin.

11. A coating method, comprising:

subjecting a composite substrate to be coated to a surface treatment to obtain a pretreated composite substrate;

preheating the pretreated composite substrate to obtain a preheated substrate; and spraying and curing a powder coating in sequence on a surface of the preheated substrate;

wherein the preheating is conducted at a temperature of 80° C. to 170° C. for 6 min to 12 min, and the powder coating is the special powder coating for the weather-resistant composite of claim 1.

12. The coating method of claim 11, further comprising spraying a conductive primer before spraying the powder coating, wherein the conductive primer is one selected from the group consisting of an epoxy resin powder conductive primer, an epoxy polyester conductive primer, a pure polyester powder conductive primer, a polyurethane (PU) powder conductive primer, and an acrylic powder conductive primer.

* * * * *